United States Patent [19]

Sirotkina et al.

[11] 4,095,032

[45] June 13, 1978

[54] PHOTOSENSITIVE POLYMERIC MATERIAL AND ELECTROPHOTOMETRIC MATERIAL PREPARED BY REACTING SECONDARY AROMATIC AMINE WITH VINYL ALKYLETHER OR VINYL ACETATE IN THE PRESENCE OF STRONG ACID AND HG (II) OR PB (IV) CATALYST

[76] Inventors: Ekaterina Egorovna Sirotkina, prospekt Lenina, 87, kv. 6; Vadim Petrovich Lopatinsky, prospekt Lenina, 43, kv. 10a; Viktor Dmitrievich Filimonov, ulitsa Usova, 25b, kv. 9; Rita Moiseevna Kogan, ulitsa Vershinina, 37, kv. 205; Vyacheslav Dmitrievich Pirogov, Studgorodok, 2, kv. 8; Sofya Ivanovna Kudinova, Komsomolsky prospekt, 39/2, kv. 6; Ljubov Sergeevna Sizova, ulitsa Osipenko, 31, kv. 215; Svetlana Stepanovna Reznikova, ulitsa Usova, 11a, kv. 109; Georgy Nikolaevich Ivanov, prospekt Kirova, 1, kv. 3a; Nina Alexandrovna Tsekhanovskaya, poselok Sputnik 8, kv. 316, all of Tomsk; Jonas-Donatos Bronyaus Sidaravichus, ulitsa R. Charno, 1, kv. 48, Vilnjus; Larisa Vasilievna Randina, prospekt Lenina 30, Tomsk; Svetlana Leonidovna Bocharova, prospekt Lenina 30, Tomsk; Galina Petrovna Gulyaeva, prospekt Lenina 30, Tomsk; Raisa Ivanovna Bondarenko, prospekt Lenina 30, Tomsk; Galina Ivanovna Rybalko, ulitsa Zhirmanu, 20 kv. 82, Vilnjus; Yanina Antono Adomanite, ulitsa Antokalne, 96 kv. 75, Vilnjys, all of U.S.S.R.

[21] Appl. No.: 546,187

[22] Filed: Jan. 31, 1975

Related U.S. Application Data

[62] Division of Ser. No. 307,224, Nov. 16, 1972, abandoned.

[51] Int. Cl.$^2$ .......... C08F 7/12; C08J 3/00

[52] U.S. Cl. .......... 526/11.1; 96/1.5 R

[58] Field of Search ........ 260/80.3 N, 470 A, 89.7 N, 260/80.72, 88.3 R, 576, 583 H, 32.8 R, 33.8 R, 29 R; 526/310, 258, 902, 11.1; 96/1.5

[56] References Cited

U.S. PATENT DOCUMENTS

| | | | |
|---|---|---|---|
| 2,087,079 | 7/1937 | Wolff | 260/89.7 N |
| 3,272,755 | 9/1966 | Shiraiff | 260/29.6 HN |
| 3,336,279 | 8/1967 | Scott | 260/89.7 N |
| 3,558,581 | 1/1971 | Beerm ann | 260/89.7 N |
| 3,642,730 | 2/1972 | Amiard et al. | 260/80.72 |
| 3,705,031 | 12/1972 | Kinjo et al. | 260/80.72 |
| 3,767,393 | 10/1973 | Fox | 260/576 |

FOREIGN PATENT DOCUMENTS

| | | |
|---|---|---|
| 332,099 | 3/1972 | U.S.S.R. |

OTHER PUBLICATIONS

Lopatinsky et al.— Izvestia Tomskogo Politephnicheskogo Instituta, 111, 44, 1961.

Lopatinsky, et al. — Izvestia Tomskogo Politephnicheskogo Instituta, 136, 30, 1965.

*Primary Examiner*—Joseph L. Schofer
*Assistant Examiner*—Peter F. Kulkosky
*Attorney, Agent, or Firm*—Haseltine, Lake & Waters

[57] ABSTRACT

A photosensitive polymeric material having photoelectric properties based on poly-N-vinylamines, which actually comprise poly-N-vinyldiphenylamine, its derivatives, and also copolymers of N-vinyldiphenylamine with N-vinylamines, poly-N-vinylphenothiazine and poly-N-vinylphenoxazine.

The polymers are applied onto an electroconductive substrate to give an electrophotographic material.

Said polymers are prepared by a method consisting in the interaction between secondary aromatic and heterocyclic amines or their mixtures with simple vinyl ethers in the presence of strong acids or with vinyl acetate in the presence of salts of mercury (II) or lead (IV), a strong acid and water.

7 Claims, No Drawings

PHOTOSENSITIVE POLYMERIC MATERIAL AND ELECTROPHOTOMETRIC MATERIAL PREPARED BY REACTING SECONDARY AROMATIC AMINE WITH VINYL ALKYLETHER OR VINYL ACETATE IN THE PRESENCE OF STRONG ACID AND HG (II) OR PB (IV) CATALYST

This application is a divisional application of Ser. No. 307,224, filed Nov. 16, 1972, now abandoned.

This invention relates to electrophotography, and more particularly to photosensitive polymeric materials on the basis of poly-N-vinylamines possessing photoelectric properties, electrophotographic materials consisting of a supporting material or substate and photosensitive polymeric material and methods for manufacturing them.

Some poly-N-vinylamines are known to have been used in the prior art as photosensitive polymer materials and materials for electrophotography. FRG Pat. Nos. 1,068,115 and 1,158,367 teach the use of poly-N-vinylcarbazole in the capacity of photosensitive polymeric material and suggest that electrophotographic materials should be prepared on its base. These patents also propose methods for preparing poly-N-vinylcarbazole by polymerizing N-vinylcarbazole under the action of various catalysts. U.S. Pat. No. 3,155,503 teaches photosensitive polymeric materials on the basis of polymers and copolymers of N-vinylcarbazole prepared by polymerizing the latter and copolymerizing it with various monomers. FRG Pat. Nos. 1,906,831 and 1,917,744 teach electrophotographic materials consisting of a metallic supporting material with a photosensitive polymeric material applied onto it, the said photosensitive polymeric material being made on the basis of polymers of N-vinylindole and its copolymers with the other monomers prepared by polymerization of N-vinylindole.

A method is known in the prior art for preparing poly-N-vinylcarbazole by carrying out the reaction of pervinylation of carbazole with vinyl acetate in the presence of salts of mercury (II), strong acids in a medium of aliphatic ketones (Lopatinsky, V. P., Sirotkina, E. E., et al, Izvestia Tomskogo Politekhnicheskogo Instituta, 111, 44, 1961). Poly-N-vinyldiphenylamine was prepared by a similar process (Lopatinsky, V. P., Sirotkina, E. E., Kovaleva, L. F., Izvestia Tomskogo Politekhnicheskogo Instituta, 136, 30, 1965).

The disadvantage inherent in the prior art methods for preparing poly-N-vinylamines by polymerizing the appropriate N-vinylamines, is that the process is carried out in many steps and requires complicated process equipment which is due to the necessity of preparing, isolating and thoroughly purifying the starting monomers. All these operations raise the cost of the poly-N-vinylamine. Moreover, some N-vinylamines, for example N-vinylcarbazole, are toxic which complicates the process for preparing poly-N-vinylamines by polymerizing the monomers and raises the cost of production. The method for preparing poly-N-vinylcarbazole, poly-N-vinylindole and poly-N-vinyldiphenylamine by the reaction of pervinylation of the corresponding amines with vinyl acetate is realized in one step, which significantly simplifies the process and makes it cheaper. Moreover it obviates the necessity of preparing and purifying the starting monomers. According to this method, a cheap and readily available material, viz., vinyl acetate is used as the reagent. However, the above described method for preparing poly-N-vinylcarbazole suitable for use as a photosensitive polymeric material is inefficient since the yield of the required polymer is only 15 – 20 percent, while the main product of the reaction is the 'high molecular fraction' of poly-N-vinylcarbazole which is only sparingly soluble in organic solvents and has no film-forming properties. The disadvantage of this method for preparing poly-N-vinyldiphenylamine by the reaction of pervinylation of diphenylamine with vinyl acetate is an unstable and low yield of the polymers, and the use of relatively large amounts of toxic catalyst on the basis of mercury (not less than 5 percent by weight with respect to diphenylamine). Moreover, this method cannot be used to prepare poly-N-vinylcarbazole, poly-N-vinyldiphenylamine and poly-N-vinylindole with solvents other than acetone and methyl ethyl ketone.

The disadvantage inherent in the electrophotographic materials on the basis of poly-N-vinylamines is their high cost, which is due (as has already been said) to the high cost of the starting poly-N-vinylamines.

The object of this invention is to widen the range of photosensitive polymeric materials and electrophotographic materials obtained by applying photosensitive polymeric material on an electroconductive supporting material.

Another object of this invention is to work out a method for preparing photosensitive polymeric materials on the basis of poly-N-vinylamines directly from amines by a single-step process, obviating the labour-consuming and expensive step of preparing, isolating and thoroughly purifying monomer products, and ensuring high and stable yield of the wanted products.

These objects have been attained by the provision of new photosensitive polymeric materials having photoelectric properties which according to the invention are the following poly-N-vinylamines and their copolymers:

1. poly-N-vinyldiphenylamine
2. poly-N-vinyl-4-methoxydiphenylamine
3. poly-N-vinyl-4-ethoxydiphenylamine
4. poly-N-vinyl-4-propyloxydiphenylamine
5. poly-N-vinyl-4-isopropyloxydiphenylamine
6. poly-N-vinyl-4,4$^1$-dibromodiphenylamine
7. poly-N-vinylphenothiazine
8. poly-N-vinylphenoxazine
9. copolymers of N-vinyldiphenylamine and N-vinylcarbazole
10. copolymers of N-vinyldiphenylamine and N-vinyl-3-chlorocarbazole
11. copolymers of N-vinyldiphenylamine and N-vinylindole
12. copolymers of N-vinylcarbazole and N-vinyl-3-chlorocarbazole The polymers and copolymers according to the invention are prepared by the interaction of aromatic and heterocyclic secondary amines or their mixtures with simple vinyl ethers in a medium of an organic solvent and in the presence of strong acids or with vinyl acetate in the presence of a catalyst consisting of salts of mercury (II) or lead (IV), water and strong acids.

The starting secondary amines are according to the invention aromatic amines such as diphenylamine and its derivatives containing in their benzene nuclei bromine, alkoxy groups, and heterocyclic amines such as phenothiazine, phenoxazine, indole, carbazole and its derivatives containing in their aromatic nuclei chlorine, bromine, methyl nitro and acetyl groups. The introduction into the reaction of these two amines results in copolymers. The composition of copolymers is adjusted by varying the relative amounts of amines introduced into the reaction. The relative amounts of amines can be varied within the range from 5 to 95 percent by weight.

The simple vinyl ethers used in the reaction are vinyl ethyl and vinyl butyl ethers. However, vinyl ethers of aliphatic alcohols in general can be used as the simple vinyl ethers besides the above indicated ones. These are, for example, vinyl methyl ether, vinyl propyl ether, etc. Owing to lower cost and better availability, vinyl ethyl and vinyl butyl ethers should preferably be used. If vinyl acetate is used instead of a vinyl ether, the reaction with amine takes place on the condition that salts of mercury (II) or lead (IV), strong acid and water are used as catalysts simultaneously. The optimum quantity of water required for the reaction depends on the nature of the amine introduced into the reaction, on the solvent used, and is selected empirically. For example, if the reaction is carried out with carbazole in acetone, it is necessary to add about 0.001 percent by volume of water, and if benzene or carbon tetrachloride are used, the amount of water should be 0.08 percent by volume. At the same time, the reaction with diphenylamine proceeds in the presence of small amounts of water (about 0.01 percent by volume) and in aqueous solutions of solvent (acetic acid, dioxane, nitromethane) containing from 10 to 70 percent of water. Our investigations have shown that the reaction of said amines with vinyl acetate in anhydrous solvents does not practically take place, and the presence of water is therefore the requisite condition for said process. If vinyl ethyl and vinyl butyl ethers are used, the process of formation of poly-N-vinylamines proceeds rather fast even in the presence of only one acid catalyst, such as sulfuric, perchloric and periodic acids, hydrogen chloride, or boron trifluoride etherate. Organic compounds of various classes, e.g. ketones (acetone, methyl ethyl ketone), chloroalkanes (chloroform, carbon tetrachloride), aromatic hydrocarbons (benzene, chlorobenzene, toluene, xylene), nitroparaffins (nitromethane, dioxane), carboxylic acids (acetic acid) are used as solvents. In separate cases aqueous solutions of acetic acid, acetone, dioxane, or nitromethane can be used as solvents. The isolation of the resulting poly-N-vinylamines, depending on the solvent used is realized by different procedures. If the produced polymers are soluble in the solvent used in the reaction, they are isolated by pouring the reaction mixture into a precipitator, e.g. alcohols or their aqueous solutions, paraffin hydrocarbons, water, aqueous solutions of salts, for example of sodium chloride. The thus isolated polymers are separated on a filter, washed and dried. If solvents used in the reaction do not dissolve the produced polymers, they precipitate in the process of their formation and in the end of the process they are separated on a filter, washed and dried.

According to the invention, the following new polymers and copolymers have been prepared:

1. poly-N-vinylphenoxazine
2. poly-N-vinyl-4,4'-dibromodiphenylamine
3. poly-N-vinyl-4-methoxydiphenylamine
4. poly-N-vinyl-4-ethoxydiphenylamine
5. poly-N-vinyl-4-propyloxydiphenylamine
6. poly-N-vinyl-4-isopropyloxydiphenylamine
7. poly-N-vinyl-2-acetylcarbazole
8. poly-N-vinyl-3-acetylcarbazole
9. poly-N-vinyl-3,6-diacetylcarbazole
10. poly-N-vinyl-3,6-dichlorocarbazole
11. copolymers of N-vinyldiphenylamine and N-vinylcarbazole
12. copolymers of N-vinyldiphenylamine and N-vinyl-3-chlorocarbazole
13. copolymers of N-vinyldiphenylamine and N-vinylindole
14. copolymers of N-vinylcarbazole and N-vinyl-3-chlorocarbazole Several polymers known in the prior art have also been prepared by the proposed method. They are as follows:

1. poly-N-vinylcarbazole
2. poly-N-vinyl-3-chlorocarbazole
3. poly-N-vinyl-3-methylcarbazole
4. poly-N-vinyl-3-nitrocarbazole
5. poly-N-vinyl-3-bromocarbazole
6. poly-N-vinyl-3-iodocarbazole
7. poly-N-vinyl-3,6-dibromocarbazole
8. poly-N-vinyl-1,3,6,8-tetrahydrocarbazole
9. poly-N-vinyldiphenylamine
10. poly-N-vinyl-phenothiazine
11. poly-N-vinylindole.

All these polymers are colorless or faintly colored amorphous powders having a molecular weight from 1000 to 3000, readily soluble in ketones, aromatic and chlorinated paraffin hydrocarbons, dioxane, dimethylformamide whose solutions are used to prepare films insoluble in water, poorly or completely insoluble in alcohols and paraffin hydrocarbons.

The electrophotographic material according to the invention consists of an electroconductive substrate with a photosensitive polymeric material applied onto it in a layer, the polymer being poly-N-vinyldiphenylamine and its derivatives, poly-N-vinylphenothiazine, poly-N-vinylphenoxazine and the above copolymers of N-vinyldiphenylamine with N-vinylamines.

The electrophotographic material is prepared by various methods in which electroconductive substrates are covered with the said photosensitive polymeric materials. The photosensitive polymeric material alone or together with additives is dissolved or dispersed in a suitable organic solvent and the thus prepared solution or dispersion is applied onto the electroconductive substrate with the aid of a brush or by spraying, after which the layer of the photosensitive polymeric material is dried until all solvent is removed. The other method for preparing the electrophotographic material is by applying the photosensitive polymeric material in the molten state onto the electroconductive substrate.

The thickness of the layer of the photosensitive polymeric material can be varied within wide limits depending on the requirements for a particular electrophotographic material. Good results are ensured with layers of the photosensitive polymeric material having a thickness from 5 to 30 microns, the best effect being obtained with 10 – 20 micron thickness. A layer of less than 5 microns possesses insufficient electric insulating properties, while layers whose thickness exceeds the above limits require long exposures.

The thickness of the layer should be selected experimentally by varying the amounts of the solutions, dispersions or melts of the photoconductive polymeric material which is applied onto the electroconductive substrate.

According to this invention, in order to improve the photosensitivity of the said electrophotographic materials, various additives pertaining to the classes of electron-acceptors or optical sensitizers, should be added to the solution, dispersion or molten photosensitive polymeric material. Chloranil, picric and chloroacetic acids, rhodamine, and crystal violet are examples of such additives. The optimum quantity of these additives is from 0.5 to 2.5 percent by weight.

In order to improve the elasticity of the layer of the photosensitive polymeric material on an electroconductive substrate, to increase its thermal stability and resistance to oxidation and ageing, according to this invention, substances, for example, resin, copolymers of styrene with butadiene and styrene with methacrylates should be added.

According to this invention, the said electrophotographic material is manufactured with electroconductive substrates which are metallic supports made of steel, aluminium, copper, brass, bronze, or glass plates and various polymeric films, for example, polyethylene teraphthalate, polypropylene films, etc., coated with a layer of metallic silver or platinum applied onto them by the known methods, for example by evaporation in vacuum.

According to this invention, the said electrophotographic materials can be used in various sections of electrophotography, where electrostatic charges must be discharged on the photoconductive layer during exposure to electromagnetic waves of various lengths.

The said electrophotographic material may accept electrostatic charges by various known electrophotographic methods, for example, by a corona discharge. The thus charged electrophotographic material is then subject to the action of the projected image, the irradiated parts of the charged layer are discharged and a latent electrostatic picture is formed on it which is then converted into a visible picture by numerous methods known in electrophotography, for example, by applying a charged colouring agent onto it.

The examples which follow hereinafter illustrate the invention.

EXAMPLE 1.

Preparation of poly-N-vinylcarbazole (a) A three-neck round-bottomed flask provided with a stirrer and a reflux condenser is charged successively with 450 ml of acetone, 0.05 ml of water, 100 g of carbazole and 110 ml of vinyl acetate. The mixture is heated with stirring to 50° C and 0.4 g of mercury (II) acetate and a mixture of 0.08 ml of 95 percent sulfuric acid and 50 ml of acetone is added. The course of the reaction is controlled by following up the liberation of acetic acid which is detected by titration of a 1-ml sample of the reaction mixture with a 0.1 N solution of potassium hydroxide. After the liberation of acetic acid has ceased, the reaction mixture is kept at a temperature of 50° C for another 20 minutes. The resulting polymer is separated from the solution by pouring the reaction mixture with stirring into water or an aqueous solution of sodium chloride. The precipitate is separated on a filter, washed with water to neutral reaction of the medium and dried at a temperature from 50° to 60° C.

The yield of poly-N-vinylcarbazole is 115 g (100 percent of theory). The product is a white or yellowish amorphous powder, melting at 110° - 126° C, readily soluble in chlorinated and aromatic hydrocarbons, ketones, and dimethylformamide.

Found, percent: nitrogen, 6.9; calculated, 7.24.

The molecular weight of the product is 1000 - 1500.

(b) Following the procedure described in (a), 50 g of carbazole, 250 ml of acetone, 0.025 ml of water, and 33.2 ml of vinyl acetate are heated to 50 C and 0.1 g of mercury oxide and 0.05 ml of 95 percent sulfuric acid are added.

The yield of poly-N-vinylcarbazole is 57 g (99 percent).

(c) Following the procedure described in (a), 125 ml of chloroform is mixed with 0.1 ml of distilled water, 15 g of carbazole, 10 ml of vinyl acetate, heated to 50° C and then 0.1 g of mercury acetate and 0.02 ml of 95 percent sulfuric acid are added. The resulting polymer is isolated by pouring the reaction mixture with stirring into alcohol (methyl, ethyl).

The yield of poly-N-vinylcarbazole is 16.6 g (97 percent).

The melting point of the product is 150° - 178° C.

Poly-N-vinylcarbazole can also be synthesized in other solvents by employing the same procedure. The amount of solvent, 125 ml, the temperature of the reaction, 50° C. The amount of water, 0.1 ml.

The results of synthesis in various solvents are summarized in the Table which follows.

Table

| Nos | Solvent | Quantity of carbazole in g | Quantity of vinyl acetate in ml | Quantity of Mercury acetate in g | catalyst 95% $H_2SO_4$, in ml | Yield of polymer, % of theory | Melting point, ° C |
|---|---|---|---|---|---|---|---|
| 1. | Benzene | 17.5 | 11.6 | 0.14 | 0.025 | 100 | 150–161 |
| 2. | m-Xylene | 17.5 | 11.6 | 0.14 | 0.025 | 100 | 144–149 |
| 3. | Toluene | 17.5 | 11.6 | 0.14 | 0.025 | 100 | 146–156 |
| 4. | Chlorobenzenel | 17.5 | 11.6 | 0.14 | 0.025 | 100 | 150–156 |
| 5. | Acetic acid | 25.0 | 16.6 | 0.15 | 0.030 | 100 | 130–134 |

EXAMPLE 2

Preparation of Poly-N-vinyl-3-chlorocarbazole

A three-necked round-bottomed flask provided with a stirrer and a reflux condenser is charged successively with 125 ml of acetone, 0.02 ml of water, 36 g of 3-chlorocarbazole and 18.4 ml of vinyl acetate. The components are heated with stirring to 50° C, and 0.1 g of mercury acetate and 0.02 ml of 95 percent sulfuric acid are added. The course of the reaction is followed up by the liberation of acetic acid which is controlled by titrating a 1-ml sample of the reaction mixture with a 0.1 N solution of potassium hydroxide. After the medium attains its maximum acidity, the reaction mixture is kept for 30 minutes and the resulting polymer is isolated by pouring the reaction mixture into water with stirring. The precipitated polymer is separated on a filter, washed with water and dried at a temperature from 50° to 60° C.

The yield of the polymer is 40.6 g (100 percent of theory). The product is a white amorphous powder melting at 110° - 125° C, very readily soluble in chlorinated and aromatic hydrocarbons, ketones, dimethylformamide. The polymer solutions in these solvent give good transparent films.

Found, percent: nitrogen, 6.0; chlorine, 15.7; Calculated, percent: nitrogen, 6.17; chlorine, 15.64; Molecular weight, 1000 - 1500.

EXAMPLE 3

Preparation of Poly-N-vinyl-3-methylcarbazole

Following the procedure described in example 2, 125 ml of acetone, 0.02 ml of water, 6 g of 3-methylcarbazole, 3.7 ml of vinyl acetate are heated to 50° C. Then 0.1 g of mercury acetate and 0.02 ml of 95 percent sulfuric acid are added. The resultant polymer is a white amorphous powder, melting at 190° - 200° C, readily soluble in aromatic and chlorinated hydrocarbons, ketone, and dimethylformamide to give good transparent films.

The yield of the polymer is 6.8 g (99 percent of theory).

Found, percent: nitrogen, 6.75; Calculated, percent: 6.76.

EXAMPLE 4

Preparation of Poly-N-vinyl-1,3,6,8-tetrahydrocarbazole

Following the procedure described in example 2, 125 ml of acetone, 0.02 ml of water, 10 g. of 1,3,6,8-tetrahydrocarbazole and 6.5 ml of vinyl acetate are mixed and heated to 50° C. Then 0.1 g of mercury acetate and 0.02 ml. of 95 percent sulfuric acid are added to the mixture. The resulting polymer is a white amorphous powder melting at 110° - 122°0 C, readily soluble in aromatic and chlorinated hyrocarbons, ketones and dimethylformamide to give good transparent films.

The yield of the polymer is 11.6 g (100 percent).

Found, percent: nitrogen, 7.0; Calculated, percent: 7.06.

The molecular weight of the product is 1000 - 1500.

EXAMPLE 5

Preparation of Poly-N-vinyl-3,6-dichlorocarbazole

Following the procedure described in example 2, 125 ml of acetone, 0.02 ml of water, 60 g of 3,6-dichlorocarbazole, and 28.2 ml of vinyl acetate are mixed and heated to 50° C. Then 0.1 g of mercury acetate and 0.04 ml of 95 percent sulfuric acid are added to the mixture. The resulting polymer is a white amorphous powder melting at 121° - 141° C, very readily soluble in chlorinated and aromatic hydrocarbons, ketones and dimethylformamide to give good transparent films.

The yield of the polymer is 66.5 g (100 percent of theory).

Found, percent: nitrogen, 5.3; chlorine, 27.1; Calculated, percent: nitrogen, 5.34; chlorine, 27.08

EXAMPLE 6

Preparation of Poly-N-vinyl-3-nitrocarbazole

Following the procedure described in example 2, 125 ml of acetone, 0.02 ml of water, 10 g of 3-nitrocarbazole, 5.3 ml of vinyl acetate are mixed and heated to 50° C. Then 0.1 g of mercury acetate and 0.06 ml of 95 percent sulfuric acid are added to the reaction mixture. The resulting polymer is a yellow amorphous powder melting at 195° - 210° C, readily soluble in dimethylformamide and cyclohexane; poorly soluble in the other organic solvents. The solutions give good transparent films.

The polymer yield is 11.2 g (100 percent of theory).

Found, percent; nitrogen, 11.0; Calculated, percent: nitrogen, 11.75

EXAMPLE 7

Preparation of Poly-N-vinyl-2-acetylcarbazole

The procedure is the same as described in example 2: 125 ml of acetone, 0.02 ml of water, 1.2 g of 2-acetylcarbazole and 0.54 ml of vinyl acetate are mixed and heated to 50° C. Then, 0.1 g of mercury acetate and 0.04 ml of 95 percent sulfuric acid are added to the mixture. The resultant polymer is a white amorphous powder melting at 180° - 189° C, readily soluble in cyclohexane and dimethylformamide; poorly soluble in the other organic solvents. The solutions give good transparent films.

The yield of the polymer is 1.28 g (95 percent of theory).

Found, percent: nitrogen, 6.1; calculated, 5.95.

EXAMPLE 8

Preparation of Poly-N-vinyl-3-acetylcarbazole

Following the procedure described in example 2, 125 ml of acetone, 0.02 ml of water, 4.3 g of 3-acetylcarbazole and 2.0 ml of vinyl acetate are mixed and heated to 50° C. Then, 0.1 g of mercury acetate and 0.04 ml of 95 percent sulfuric acid are added to the mixture. The resulting polymer is a white amorpous powder melting at 130° - 139° C, and readily soluble in dimethylformamide and cyclohexane to give good transparent films.

The yield of the polymer is 5.3 g (98.5 percent).

Found, percent: nitrogen, 5.9; calculated, 5.95.

EXAMPLE 9

Preparation of Poly-N-vinyl-3,6-diacetylcarbazole

Following the procedure described in example 2, 125 ml of acetone, 0.02 ml of water, 6 g of 3,6-diacetylcarbazole and 2.7 ml of vinyl acetate are mixed and heated to 50° C. Then, 0.1 go of mercury acetate and 0.08 ml of 95 percent sulfuric acid are added to the mixture. After the medium attains its maximum acidity, the reaction is continued for another 60 minutes. The resultant polymer is a white amorphous powder melting at 165° - 180° C, readily soluble in dimethylformamide and cyclohexane and poorly soluble in the other organic solvents. The solutions give good transparent films.

The yield of the polymer is 6.50 g (98 percent).

Found, percent: nitrogen, 4.85; calculated, 5.05.

EXAMPLE 10

Preparation of poly-N-vinylcarbazole

A flask equipped with a stirrer and a reflux condenser is charged with 20 g (0.12 mol) of carbazole, 100 ml of acetone, 15.5 g (0.18 mol) vinyl acetate, 0.6 g (0.0025 mol, 3 percent by weight) of lead dioxide and 0.28 g (0.00295 mol) of concentrated sulfuric acid. The flask contents are boiled with stirring for 15 hours. The non-reacted carbazole is separated on a filter, while the filtrate is poured into isopropyl alcohol. The resultant product is poly-N-vinylcarbazole, melting at 150° - 165° C. The yield of the polymer is 11.1 g (48 percent).

Found, percent: nitrogen, 7.13 ($C_{14}H_{11}N$); calculated, 7.25.

EXAMPLE 11

Preparation of Copolymers of N-vinylcarbazole and 3-chloro-N-vinylcarbazole

A three-necked round-bottomed flask of 500 ml capacity provided with a stirrer and a reflux condenser is charged successively with 125 ml of acetone, 0.02 ml of water, 12.5 g of carbazole, 12.5 g of 3-chlorocarbazole and 16.6 ml of vinyl acetate. The mixture is stirred and heated to 50° C, and then 0.1 g of mercury (II) acetate and 0.02 ml of 95 percent sulfuric acid are charged simultaneously. The course of the reaction is controlled by the liberation of acetic acid by titrating a 1-ml sample of the reaction mixture with 0.1 N solution of potassium hydroxide. After the acidity of the reaction mixture attains its maximum, it is stirred at 50° C for 20 minutes and the resulting copolymer is isolated by pouring the reaction mixture into water with stirring. The precipitate is separated on a filter, washed with water to neutral reaction and dried at 50° - 60° C.

The yield of the copolymer of N-vinylcarbazole and 3-chloro-N-vinylcarbazole is 23.5 g (100 percent). The product is a white amorphous powder melting at 115° - 130° C, readily soluble in chlorinated and aromatic hydrocarbons, ketones, dimethylformamide to give good transparent plastic films.

Found, percent: chlorine, 7.8; calculated, 7.72.

EXAMPLE 12

Preparation of poly-N-vinylcarbazole (a) A three-necked flask provided with a stirrer and a reflux condenser is charged successively with 25 ml of acetone, 0.13 ml of sulfuric acid (sp. gravity, 1.875) and 5 g of carbazole. The mixture is heated to 40° C and then 4.3 ml of vinyl ethyl ether are added gradually. The reaction is continued with stirring for 4 - 4.5 hours at a temperature of 40° C. The polymer is isolated by pouring the reaction mixture into water or a 10 percent aqueous solution of sodium chloride with intense stirring. The precipitate is separated on a filter, washed with water and dried at a temperature of 40° - 50° C. The yield of poly-N-vinylcarbazole is 5.97 g (100 percent). The product is a white or a pale pink powder melting at 112° - 114° C, and readily soluble in aromatic and chlorinated paraffin hydrocarbons, dioxane and ketones.

Found, percent: nitrogen, 7.20; calculated, in percent: nitrogen, 7.25.

The molecular weight of the product is 1000 - 1500.

(b) Following the procedure described in (a), the flask is charged with 25 ml of acetone, 0.14 ml of perchloric acid (sp. gravity, 1.76), and then 5 ml of vinyl ethyl ether are added gradually at 40° C. The reaction is continued for 150 minutes. The yield of poly-N-vinylcarbazole is 4.2 g (72 percent). The polymer melts at 118° C.

(c) Following the procedure described in (a), the flask is loaded with 5 g of carbazole, 25 ml of acetone, 0.13 ml of sulfuric acid (sp. gravity, 1.825), the contents are heated to 40° C and 5 ml of vinyl butyl ether are added gradually. The reaction is continued for 6 hours, and then the reaction mixture is poured into alcohol to give 3.5 g. (60 percent) of poly-N-vinylcarbazole. The melting point of the product is 95° - 110° C.

Found, percent: nitrogen, 6.95; calculated, 7.24.

EXAMPLE 13

Preparation of poly-N-vinyl-3-chlorocarbazole

A three-necked flask equipped with a stirrer and a reflux condenser is charged successively with 25 ml of acetone, 5 g of 3-chlorocarbazole, 0.13 ml of sulfuric acid (sp. gravity, 1.825). The mixture is heated to 40° C and 3.6 ml of vinyl ethyl ether are added. The reaction is continued for 4 hours and the reaction mixture is poured into water. The yield of poly-N-vinyl-3-chlorocarbazole is 5.44 g (90.5 percent). The product is a greyish powder melting at 97° - 100° C, readily soluble in aromatic and chlorinated paraffin hydrocarbons, ketones, dioxane, etc., to give fast transparent films.

Found, percent: nitrogen, 6.0; calculated, 6.17.

EXAMPLE 14

Preparation of poly-N-vinyl-3-methylcarbazole

A three-necked flask provided with a stirrer and a reflux condenser is charged successively with 25 ml of acetone, 5 g of 3-methylcarbazole, 0.13 ml of sulfuric acid (sp. gravity, 1.825). The mixture is heated to 40° C and 4 ml of vinylethyl ether are added. The reaction is continued for 4 - 4.5 hours and the reaction mixture is then poured into water. The yield of the polymer is 5.65 g (90 percent). The product is a pale brown powder melting at 98° - 100° C, readily soluble in aromatic and chlorinated paraffin hydrocarbons.

Found, percent: nitrogen, 6.50; calculated, 6.76.

The molecular weight of the polymer is 1000 - 2000.

EXAMPLE 15

Preparation of poly-N-vinylindole (a) A round-bottomed flask equipped with a stirrer, is charged successively with 11.7 g of indole, 100 ml of acetone, and 0.12 g of concentrated sulfuric acid (sp. gravity, 1.84). The mixture is stirred intensively and then 8.65 g of vinylethyl ether are added at a rate ensuring the maintenance of the reaction temperature not above 22° - 24° C. After all required ether has been added, the reaction is continued with stirring for 150 minutes, and then the reaction mixture is poured into water. The precipitated polymer is separated on a filter; washed with alcohol and water, dried and analyzed. The yield of poly-N-vinylindole is 14.3 g (100 percent). The melting point of the product is 95° - 115° C. The polymer is a white or slightly coloured amorphous powder, readily soluble in common organic solvents: ketones, aromatic and chlorinated paraffine hydrocarbons, dioxane, pyridine; insoluble in water, alcohols and paraffine hydrocarbons. Solutions of poly-N-vinylindole give fast transparent films.

Found, percent: nitrogen, 9.42; calculated, 9.78

The molecular weight of the polymer is 1500 - 2000.

(b) Following the procedure described in (a), 10.2 g of vinyl butyl ether are added to the reaction mixture, the contents are heated to 40° C and the reaction is continued with stirring for 2 hours. On termination of the reaction, the mixture is poured into water and the precipitated polymer is separated on a filter and washed with ethyl alcohol and water. The yield of poly-N-vinylindole is 12.7 g (89 percent).

(c) A flask is charged with 11.7 g of indole, 100 ml of acetone, 0.23 g of perchloric acid (42 percent), and then 8.65 g of vinyl ethyl ether are added dropwise with intense stirring. After all ether has been introduced into the reaction mixture, the process temperature is raised to 40° C and the reaction is continued with stirring for 150 minutes. The reaction mixture is then poured into water. The yield of the polymer is 15.0 g (105 percent). The product is a light amorphous powder. According to IR-spectroscopy, the poly-N-vinylindole prepared in the above example comprises an insignificant number of vinyl ether links incorporated in the macromolecules.

(d) A flask is charged with 11.7 g of indole, 80 ml of benzene and 0.35 g of boron trifluoride etherate. Then, 8.65 g of vinyl ethyl ether are added in drops to the reaction mixture with intense stirring. The process temperature is then raised to 40° C and the process is continued for 2 hours with stirring. The reaction mixture is then poured into 500 ml of ethyl alcohol and the precipitated polymer is separated on a filter, washed with alcohol, and water, dried and analyzed. The yield of poly-N-vinylindole is 14 g (98 percent).

(e) The procedure is the same as described in the previous experiment, but 80 ml of carbon tetrachloride are used as the solvent. The polymer is precipitated in alcohol to give 14.1 g (98.5 percent) of poly-N-vinylindole.

EXAMPLE 16

Preparation of poly-N-vinylphenothiazine (a) A round-bottomed flask is charged successively with 19.9 g of phenothiazine, 150 ml of chloroform and 0.6 g of boron trifluoride etherate. Then 14.4 g of vinyl ethyl ether are added dropwise at 20° C with stirring and the reaction temperature is raised to 40° C. The process is continued for 2 hours and the reaction mixture is then poured into 200 ml of ethyl alcohol. The precipitated polymer is separated on a filter, washed with alcohol and water, dried and analyzed. The yield of poly-N-vinylphenothiazine is 20.5 g (91.5 percent). The polymer is an amorphous powder of pale grey color, readily soluble in common organic solvents: ketones, aromatic and chlorinated paraffin hydrocarbons, dioxane; insoluble in water, alcohols and paraffin hydrocarbons. The solutions of poly-N-vinylphenothiazine give fast transparent films. The melting point of the polymer is 130° - 150° C.

Found, percent: nitrogen, 6.10; calculated, 6.20.

The molecular weight of the product is 1500 - 2000.

(b) A round-bottomed flask is charged successively with 19.9 g of phenothiazine, 100 ml of acetone, 0.6 g of boron trifluorate etherate, and them 10.8 g of vinyl ethyl ether are added in drops with stirring at 20° C. The reaction mixture is then heated to 40° C and the process is continued for 2 hours. On termination of the reaction, the mixture is poured into water, the precipitate is separated on a filter, washed with alcohol and water, dried and analyzed. The yield of poly-N-vinylphenothiazine is 20.8 g (93 percent).

(c) A flask is charged with 19.9 g of phenothiazine, 100 ml of acetone and 0.5 g of concentrated sulphuric acid. Then, 10.8 g of vinyl ethyl ether are added in drops with stirring at 20° C. The mixture is then heated to 40° C and the reaction is continued with stirring for 2 hours. The reaction mixture is then poured into water, the precipitated polymer is separated on a filter, washed with alcohol and water, dried and analyzed. The yield of poly-N-vinylphenothiazine is 21.3 g (100 percent).

EXAMPLE 17

Preparation of poly-N-vinylphenoxazine

A flask is charged with 10 g of phenoxazine, 100 ml of acetone, 0.25 g of concentrated sulfuric acid and then 5.95 g of vinyl ethyl ether are added with intense stirring. The reaction is continued with stirring at 20° C for 20 - 30 minutes. The reaction mixture is then poured into water, the precipitated polymer is separated on a filter, washed with alcohol and water, dried and analyzed. The yield of poly-N-vinylphenoxazine is 11.5 g (100 percent). The polymer is a pale green amorphous powder, readily soluble in ketones, aromatic and chlorinated paraffine hydrocarbons. The solutions of poly-N-vinylphenoxazine give fast and transparent films.

Found, percent: nitrogen, 6.68; calculated, 6.73.

EXAMPLE 18

Preparation of poly-N-vinylphenothiazine (a) A flask equipped with a stirrer is charged successively with 19.9 g of phenothiazine, 100 ml of acetone, 0.02 ml of water, 0.39 g of mercury acetate, 0.36 g of concentrated sulfuric acid, and then 17.2 g of vinyl acetate are added at a rate ensuring the maintenance of the reaction temperature not above 22° - 24° C. The process is continued at this temperature for 2 hours with constant stirring. On termination of the reaction, the solution is filtered and the filtrate is poured into 500 l ml of ethyl alcohol. The precipitated polymer is separated on a filter, washed with alcohol and water, dried and analyzed. The yield of poly-N-vinylphenothiazine is 13.5 g (60 percent). The polymer is a grey amorphous powder, readily soluble in ketones, aromatic and chlorinated hydrocarbons and dioxane: poorly soluble in alcohols. The solutions of the polymer give fast transparent films. The melting point of the product is 130° - 150° C.

Found, percent, nitrogen, 5.37; calculated, 6.20.

The molecular weight of the polymer is 1500 - 2000.

(b) The procedure is the same as described in the previous experiment, except that 0.3 g of mercury dioxide and 0.5 g of concentrated sulphuric acid are used as a catalyst. The reaction is carried out at room temperature for three hours. The reaction mixture is filtered, the filtrate is poured into 500 ml of ethyl alcohol, the precipitated polymer is separated on a filter and washed with alcohol and water. The yield of poly-N-vinylphenothiazine is 12 g (53.5 percent).

EXAMPLE 19

Preparation of poly-N-vinylphenoxazine (a) A flask equipped with a stirrer is charged with 10 g of phenoxazine, 500 ml of acetone, 0.01 ml of water, 0.3 g of mercury acetate and 0.27 g of concentrated sulfuric acid. Then the stirrer is actuated and 7.6 g of vinyl acetate are added. The reaction is continued for 15 - 20 minutes at room temperature. On termination of the reaction, the mixture is poured into water, the precipitated polymer is separated on a filter, washed with alcohol and water, dried and analyzed. The yield of poly-N-vinylphenoxazine is 11.5 g (100 percent). The polymer is a pale green amorphous powder, readily soluble is ketones, aromatic and chlorinated paraffin hydrocarbons; insoluble in water, alcohols and paraffin hydrocarbons. As the solvent is evaporated, poly-N-vinylphenoxazine forms fast transparent films. The melting point of the product is 130° - 150° C.

Found, percent: nitrogen, 6.63; calculated, 6.73.

The molecular weight of the product is 1500 - 2000.

(b) Into a flask containing 10 g of phenoxazine, 0.3 g of mercury acetate, 0.01 ml of water, 0.27 g of sulfuric acid in 400 ml of chloroform, are added 7.6 g of vinyl acetate. The reaction is continued for 15 - 20 minutes at room temperature. On termination of the reaction, 200 ml of the chloroform are distilled in vacuum from the reaction mixture and the remaining mixture is poured into 1000 ml of ethyl alcohol. The precipitated polymer is separated on a filter, washed with alcohol and water and dried. The yield of poly-N-vinylphenoxazine is 11.5 g (100 percent).

EXAMPLE 20

Preparation of poly-N-vinyldiphenylamine (a) A flask is charged with 16.9 g of diphenylamine, 80 ml of acetone, 0.18 ml of water, 0.17 g of mercury acetate and then 0.15 ml of concentrated sulfuric acid and 14.3 ml of vinyl acetate are added at 20° C with stirring at a rate ensuring the maintenance of the process temperature not above 25° - 26° C. The process is continued for 3 - 3.5 hours and the reaction mixture is poured into ethyl alcohol. The yield of poly-N-vinyldiphenylamine is 17.2 g (88.2 percent). The melting point of the product is 117° - 121° C. The molecular weight of the polymer is 1500 - 2000.

(b) A flask is charged with 8.45 g of diphenylamine, 40 ml of 30 percent aqueous solution of acetic acid, 0.09 g of mercury acetate, 0.118 ml of sulfuric acid and then 9.2 ml of vinyl acetate are added gradually at 20° C with stirring. The reaction is continued for 3 - 4 hours at 20° C with stirring, the process being controlled by determining the amount of acetic acid formed in the reaction. On termination of the reaction, the precipitated polymer is separated on a filter, washed with water to neutral reaction of the washings, and dried. The yield of poly-N-vinyldiphenylamine is 9.75 g (99.4 percent). The melting point of the polymer is 112° - 119° C; molecular weight, 1250 - 1500.

EXAMPLE 21

Preparation of poly-N-vinyl-4-ethoxydiphenylamine 2.15 g of 4-ethoxydiphenylamine, 11 ml of acetone, 0.1 ml of water, 0.04 g of mercury acetate, 0.03 ml of sulfuric acid 1.8 ml of vinyl acetate are mixed for 3 hours at 25° C and the reaction mixture is poured into 300 ml of ethyl alcohol to give 2.0 g (83.2 percent) of the polymer. The melting point of the product is 60° - 67° C, molecular weight, 2000 - 2500.

EXAMPLE 22

Preparation of poly-N-vinyl-4-propyloxydiphenylamine 2.27 g of 4-propyloxydiphenylamine, 12 ml of acetone, 0.1 ml of water, 0.034 g of mercury acetate, 0.04 ml of sulfuric acid and 18 ml of vinyl acetate are mixed for 3 hours at 25° C and poured into ethyl alcohol to obtain 2.1 g (83 percent) of the polymer, melting at 78° - 88° C. The molecular weight of the polymer is 2000 - 2500.

EXAMPLE 23

Preparation of poly-N-vinyl-4-isopropyloxydiphenylamine 2.27 g of 4-isopropyloxydiphenylamine, 12 ml of acetone, 0.1 ml of water, 0.064 g of mercury acetate, 0.04 ml of sulfuric acid and 1.8 ml of vinyl acetate are mixed for 3 hours at 25° C and poured into 300 ml of ethyl alcohol. The yield of the polymer is 2.0 g (79 percent). The melting point is 80° - 90° C; molecular weight, 2500 - 3000.

EXAMPLE 24

Preparation of poly-N-vinyl-4,4'-dibromodiphenylamine 3.48 g of 4,4'-dibromodiphenylamine, 17.5 ml of acetone, 0.1 ml of water, 0.052 g of mercury acetate, 0.053 ml of sulfuric acid and 1.8 ml of vinyl acetate are mixed for 4 hours at 20° C and poured into 450 ml of ethyl alcohol. The yield of the polymer is 2.1 g (56 percent). The melting point of the product is 121° - 127° C; molecular weight, 2500 - 3000.

EXAMPLE 25

Preparation of poly-N-vinyl-4-methoxydiphenylamine 4.9 g of 4-methoxydiphenylamine, 2.5 ml of vinyl acetate, 0.098 g of mercury acetate, 0.09 ml of sulfuric acid, 2.5 ml of acetone and 0.2 ml of water are mixed for 3 hours at 25° and poured into 400 ml of ethyl alcohol. The yield of the polymer is 2.9 g (54 percent). The melting point of the product is 118° - 128° C; molecular weight, 2000 - 2500.

EXAMPLE 26

Preparation of copolymers of N-vinyldiphenylamine with N-vinylcarbazole

A three-necked flask is charged with 0.25 g of mercury acetate, 0.23 ml of sulfuric acid, 42 ml of acetone, 0.25 ml of water, 8 g of diphenylamine and 0.42 g of carbazole. Then 7.16 ml of vinyl acetate are added gradually with stirring and the reaction is continued at 20° C. The course of the reaction is followed by controlling the amount of acetic acid liberated in the process. After the amount of the acid liberated is 2.8 - 3.0 g, the reaction is continued for another 40 minutes, then the reaction mixture is poured with stirring into 800 ml of ethyl alcohol or an aqueous-ethanol solution (water:alcohol = 1:3). The yield of the copolymer is 8.1 g. The melting point of the product is 128° - 134° C; molecular weight, 1500 - 2000.

Copolymers with the other starting amines are prepared by the same procedure.

EXAMPLE 27

Preparation of copolymers of N-vinyldiphenylamine and N-vinyl-3-chlorocarbazole 6.76 g of diphenylamine, 1.69 g of 3-chlorocarbazole, 42 ml of acetone, 0.25 ml of water, 0.25 g of mercury acetate, and 0.23 ml of sulfuric acid and charged into the reaction vessel and then 7.16 ml of vinyl acetate are added dropwise. The reaction is carried out at 20° C. The course is controlled by determining the amount of acetic acid in the reaction mixture. As soon as 2.6 - 3.0 g of acetic acid have been liberated, the reaction is continued for another 40 minutes and the reaction mixture is poured into 800 ml of ethyl alcohol or its a mixture with water. The precipitated copolymer is separated on a filter. The yield of the copolymer is 6.0 g. The melting point of the product is 119° - 126° C. The molecular weight, 1500 - 2000.

Copolymers with the other starting amines are prepared by a similar procedure.

EXAMPLE 28

Preparation of copolymers of N-vinyldiphenylamine and N-vinylindole.

To a mixture of 8.03 g of diphenylamine, 0.42 g of indole, 42 ml of acetone, 0.25 ml of water, 0.25 g of mercury acetate, and 0.23 ml of sulphuric acid, are added dropwise 7.16 ml of vinyl acetate. The reaction is continued at 20° C for hours and the copolymer is isolated by pouring the reaction mixture into 800 ml of ethyl alcohol or its mixture with water. The yield is 3.2 g of the copolymer melting at 134° - 138° C. The molecular weight of the product is 1500 - 2000.

Other copolymers of N-vinyldiphenylamine and N-vinylindole (the starting amines being taken in various ratios) can be prepared by a similar procedure.

EXAMPLE 29

Preparation of poly-N-vinyldiphenylamine (a) A flask is loaded with 8.45 g of diphenylamine, 50 ml of acetone, 0.2 ml of perchloric acid (sp. gravity, 1.42 the contents are heated to 30° C and 5.4 ml of vinyl ethyl ether are added gradually. The process is continued for 4 - 5 hours at 30° C. The polymer is isolated from the reaction mixture by pouring the latter into ethyl alcohol or its mixture with water. The yield is 7.1 g (72 percent) of poly-N-vinyldiphenylamine melting at 99° - 107° C.

Found, percent: nitrogen, 7.2; calculated, 7.18

The molecular weight of the product is 1200 - 1500.

(b) A flask is loaded with 8.45 g of diphenylamine, 50 ml of acetone, 0.25 ml of sulfuric acid (sp. gravity, 1.84) and 5.4 ml of vinyl ethyl ether. The process is continued for 4 hours at 30° C. The polymer is isolated by pouring the reaction mixture into 800 ml of ethyl alcohol or its mixture with water. The yield is 6.1 g (61.8 percent) of poly-N-vinyldiphenylamine. The molecular weight of the polymer is 1400 - 1900.

(c) A flask is loaded with 8.45 g of diphenylamine, 50 ml of acetone, 5.4 ml of vinyl ethyl ether, 0.2 ml of boron trifluoride etherate at a temperature of 30° C. The reaction is continued for 4 - 4.5 hours and the polymer is separated from the reaction products by pouring the reaction mixture into 800 ml of ethyl alcohol or its mixture with water. The yield is 5.2 g (52.6 percent) of poly-N-vinyldiphenylamine, melting at 117° - 128° C. The molecular weight of the polymer is 1200 - 1500.

EXAMPLE 30

Preparation of poly-N-vinyldiphenylamine

A flask is charged with 8.45 g of diphenylamine, 50 ml of acetone, 0.25 ml of perchloric acid (sp. gravity, 1.42) and then 7.5 ml of vinyl butyl ether are added dropwise at a temperature of 40° C. The reaction is continued for 4 hours at 40° C with stirring. Then the reaction mixture is poured into 800 ml of ethyl alcohol. The yield is 6.1 g (61.8 percent) of poly-N-vinyldiphenylamine, melting at 113° - 119° C. The molecular weight of the polymer is 1200 - 1500.

EXAMPLE 31

Electrophotographic material on the basis of poly-N-vinyldiphenylamine 0.25 g of poly-N-vinyldiphenylamine prepared according to examples 20 (a) and 20 (b) are dissolved in 1 ml of benzene or toluene and the solution is applied onto a steel substrate by pouring. The thus obtained layer is dried at room temperature until all solvent is removed. The following standard procedure is used for testing all electrophotographic materials.

An electrophotographic material is charged in the dark by a corona discharge at a voltage of 10 - 12 kV across the electrodes to the maximum potential (the charge potential) which is recorded on an oscillograph. Then the charged electrophotographic material is illuminated with an incandescent lamp ensuring the illumination intensity on the material of 150 lux, and the time, during which half the initial potential is discharged exposure time is measured.

Charge potential, 450 - 500 V. Exposure, 10 - 12 sec.

EXAMPLE 32

Electrophotographic material on the basis of poly-N-vinyl-4-ethoxydiphenylamine

An electrophotographic material is prepared by a procedure as described in example 31 from 0.25 g of poly-N-vinyl-4-ethoxydiphenylamine prepared according to example 21 in 1 ml of benzene or toluene.

The charge potential, 440 - 500 V; exposure, 48 - 50 sec.

EXAMPLE 33

Electrophotographic material on the basis of poly-N-vinyl-4-propyloxydiphenylamine The electrophotographic material is prepared as described in example 31 from 0.25 g of poly-N-vinyl-4-propyloxydiphenylamine prepared as described in example 22 in 1 ml of benzene or toluene.

Charge potential, 350–400 V; exposure, 43 - 47 sec.

EXAMPLE 34

Electrophotographic material on the basis of poly-N-vinyl-4-isopropyloxydiphenylamine The electrophotographic material is prepared by the procedure described in example 31 from 0.25 g of poly-N-vinyl-4-isopropyloxydiphenylamine prepared as described in example 23 in 1 ml of benzene or toluene.

The charge potential, 400 - 450 V; exposure, 90 - 95 sec.

EXAMPLE 35

Electrophotographic material on the basis of poly-N-vinyl-4,4'-dibromodiphenylamine.

The electrophotographic material is prepared as described in example 31 from 0.25 g of poly-N-vinyl-4,4'-dibromodiphenylamine prepared as described in example 24 in 1 ml of benzene or toluene.

The charge potential, 530 - 600 V; exposure, 16 - 20 sec.

EXAMPLE 36

Electrophotographic material on the basis of copolymers of N-vinyldiphenylamine and N-vinylcarbazole The electrophotographic material is prepared as described in example 31 from 0.25 g of the said copolymer prepared by the procedure as described in example 26 in 1 ml of benzene or toluene.

The charge potential, 400 - 500 V; exposure, 4 - 5 sec.

EXAMPLE 37

Electrophotographic material on the basis of copolymer of N-vinyldiphenylamine and N-vinyl-3-chlorocarbazole The electrophotographic material is prepared as described in example 31 from 0.25 g of the said copolymer prepared as described in example 27 in 1 ml of benzene or toluene.

The charge potential, 400 - 450 V; exposure, 5 - 6 sec.

EXAMPLE 38

Electrophotographic materials on the basis of N-vinyldiphenylamine and N-vinylindole The electrophotographic material is prepared as described in example 31 from 0.25 g of the said copolymer obtained according to the procedure described in example 28 in 1 ml of benzene or toluene.

The charge potential, 500 - 600 V; exposure, 11 - 12 sec.

EXAMPLE 39

Electrophotographic material on the basis of poly-N-vinyldiphenylamine with additives (a) the electrophotographic material is prepared as described in example 31 from 1 g of poly-N-vinyldiphenylamine prepared according to example 20 (a), dissolved in 3 ml of toluene with an additive of 0.014 g of chloranil.

The charge potential, 300 - 400 V; exposure, 16 - 18 sec.

(b) the electrophotographic material is prepared as described in example 31, from 1 g of poly-N-vinyldiphenylamine prepared according to the procedure described in example 20 (a) dissolved in 3 ml of toluene with an addition of 0.0058 g of chloroacetic acid.

The charge potential, 300 - 350; exposure, 10 - 12 sec.

(c) The electrophotographic material is prepared as described in example 31 from 1 g of poly-N-vinyldiphenylamine prepared according to the procedure described in example 20 (a) in 3 ml of toluene with an addition of 0.018 g of picric acid.

The charge potential, 300 - 350 V; exposure, 2–3 sec.

(d) the electrophotographic material is prepared as described in example 31 from 1 g of poly-N-vinyldiphenylamine prepared according to the procedure as described in example 20 (a) in 3 ml of toluene with an addition of 0.024 g of crystal violet.

The charge potential, 250 - 300 V; exposure, 8 - 9 sec.

(e) the electrophotographic material is prepared as described in example 31 from 1 g of poly-N-vinyldiphenylamine prepared according to the procedure as described in example 20 (a) in 3 ml of toluene with an addition of 0.018 g of rhodamine B.

The charge potential, 250 - 300 V; exposure, 7 - 8 sec.

(f) the electrophotographic material is prepared as described in example 31 from 0.25 g of poly-N-vinyldiphenylamine prepared according to the procedure as described in example 20 (a) in 1 ml of benzene with an addition of 0.13 g of colophony.

The charge potential, 700–800 V; exposure, 3–4 sec.

EXAMPLE 40

Electrophotographic material on the basis of poly-N-vinyldiphenylamine

The electrophotographic material is prepared as described in example 31 from 0.25 g of poly-N-vinyldiphenylamine prepared according to the procedure described in example 29 (a) in 1 ml of benzene.

The charge potential, 400 - 500 V; exposure, 8 - 9 sec.

EXAMPLE 41

Electrophotographic material on the basis of poly-N-vinyl-phenothiazine

The electrophotographic material is prepared as described in example 31 from 0.3 g of poly-N-vinylphenothiazine prepared according to the procedure as described in examples 16 and 18 in 1 ml of toluene.

The charge potential, 200 - 350 V; exposure, 2–7 sec.

EXAMPLE 42

Electrophotographic material on the basis of poly-N-vinylphenoxazine

The electrophotographic material is prepared as described in example 31 from 0.3 g of poly-N-vinylphenoxazine prepared according to the procedure as described in Examples 17 and 19 in 1 ml of toluene.

The charge potential, 350 - 500 V; exposure, 3 - 7 sec.

What is claim is:

1. A method for preparing a photosensitive polymeric material possessing photoelectric properties comprising reacting in a medium of an organic solvent an aromatic secondary amine or mixture thereof with a heterocyclic secondary amine, with a vinyl ether of an aliphatic alcohol in the presence of a strong acid.

2. A method for preparing a photosensitive polymeric material possessing photoelectric properties comprising reacting in a medium of an organic solvent an aromatic secondary amine or mixture thereof with a heterocyclic secondary amine, with vinyl acetate in the presence of a salt of mercury (II), a strong acid and water.

3. A method according to claim 2 wherein the amount of water is at least 0.001 percent by volume.

4. A method for preparing a photosensitive polymeric material possessing photoelectric properties comprising reacting in a medium of an organic solvent an aromatic secondary amine or mixture thereof with a heterocyclic amine, with vinyl acetate in the presence of a salt of lead (IV), water and a strong acid.

5. The method of claim 1 wherein said aromatic secondary, amine is selected from the group consisting of diphenylamine, bromodiphenylamines and alkoxydiphenylamines.

6. The method of claim 2 wherein said aromatic secondary amine is selected from the group consisting of diphenylamine, bromodiphenylamines and alkoxydiphenylamines.

7. The method of claim 4 wherein said aromatic secondary amine is selected from the group consisting of diphenylamine, bromodiphenylamines and alkoxydiphenylamines.

* * * * *